Aug. 21, 1934.　　　K. L. TATE　　　1,970,715
THERMOMETER AND METHOD OF MAKING THE SAME

Filed Sept. 4, 1931

INVENTOR
Kenneth L. Tate
BY D. Clyde Jones
ATTORNEY

Patented Aug. 21, 1934

1,970,715

UNITED STATES PATENT OFFICE 1,970,715

THERMOMETER AND METHOD OF MAKING THE SAME

Kenneth L. Tate, Rochester, N. Y., assignor to Taylor Instrument Companies, Rochester, N. Y., a corporation of New York Application September 4, 1931, Serial No. 561,214

11 Claims. (Cl. 297—3)

This invention relates to the structure and to the method of making thermometers including a glass and metal capillary tube as well as a metal bulb, and more particularly to a method of making an efficient joint between a metal capillary tube and a metal bulb.

In my recently issued Patent #1,811,190, granted June 23, 1931, I have shown an arrangement for joining a metal capillary tube to the glass stem of a thermometer having a metal and glass capillary tube. In accordance with one feature of the present invention, a new and improved method is disclosed for joining a metal capillary tube to the metal bulb, such as is used in a thermometer of the above-mentioned type. A further feature of the invention relates to thermometers having a metal bulb and a metal capillary tube, where the capillary tube is welded to the interior of the bulb.

Figure 1:
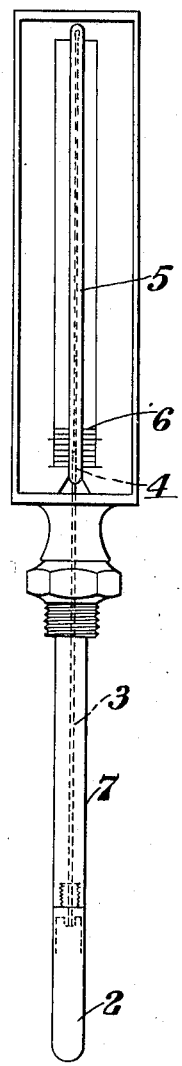
Figure 2:
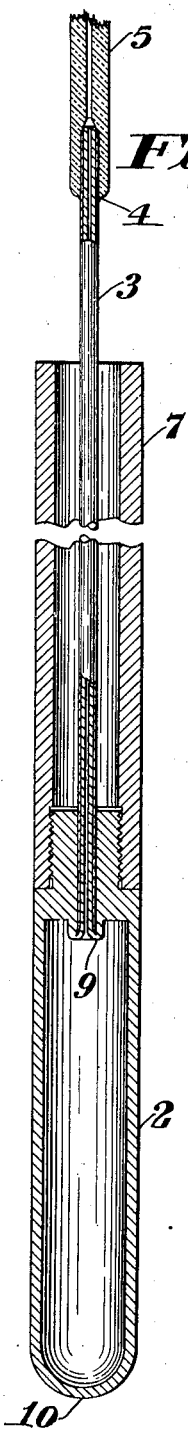
Figure 3:
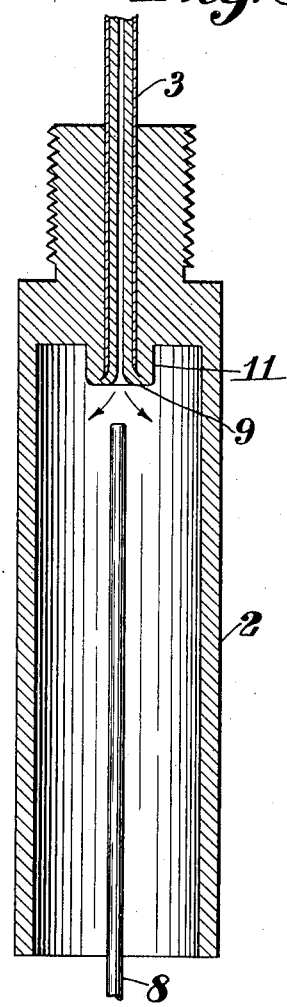

These features and others will appear from the detailed description and claims, when taken with the drawing in which Fig. 1 is a front view of one form of a complete thermometer incorporating the present invention; Fig. 2 is an enlarged cross sectional view of the bulb with a portion of the capillary tube also partially in section welded thereto and a portion of a glass capillary tube in section; and Fig. 3 is a cross sectional view of a piece of metal capillary tube and bulb welded thereto, indicating the method of welding the capillary tube to the bulb.

The present invention is particularly adapted for a thermometer of the type shown in Fig. 1 including a metal bulb 2, opening into a metal capillary tube 3 which, in turn, is joined, as shown at the point 4, to a glass capillary tube or stem 5. It will be understood that for clearness in disclosure, the size of certain of the parts, such as the metal capillary tube and the metal bulb, have been greatly exaggerated with respect to the remaining parts. The stem may have associated therewith a graduated scale indicated at 6 and the metal capillary tube 3 may be enclosed in the metal tube 7, which has its ends fastened respectively to the upper part of the bulb 2 and to the frame of the scale 6. Capillary tube 3 may be formed of either a composite alloy comprising an inner layer of invar and an outer layer of copper, or a single metal alloy of such character that it may be sealed into the glass stem 5 of the thermometer without breakage of the glass stem due to the unequal expansion of the glass and the metal tube, as disclosed in my mentioned patent.

Since the capillary tube 3 is very fine, having an internal diameter which may vary from .003 of an inch to .005 of an inch, and a minimum outside diameter of .035 of an inch, it becomes especially difficult to weld the capillary to the bulb without danger of closing the capillary tube or else completely melting it off.

To form the joint between the bulb and the metal capillary tube, the tube is inserted through an opening in the upper end of the bulb 2, which opening is surrounded by a peripheral flange 11. The bulb has its lower end open at this stage of the operation, and is then internally welded at point 9 to the interior of the bulb at the inner edge of the peripheral flange 11.

In making this weld, a tungsten electrode is used with the bulb 2 forming the other electrode. In the welding operation the electrode 8 is brought into contact with the junction 9 of the bulb 2 and the capillary 3, and then separated so as to strike an arc. During the welding operation, a non-oxidizing or reducing gas such as hydrogen is blown or passed through the capillary tube in the direction of the arrows. This gas serves two purposes, since it prevents the fusing over or closing of the outlet of the tube and also eliminates the formation of scale at the junction. In the event that the capillary tube is formed of composite metal such as invar, with a copper sheath thereon the exposed copper, at the time of the welding operation, disperses into the metal of the bulb, and thus the copper is not subsequently attacked by the mercury at the weld when the bulb and the metal capillary tube are filled with expansible liquid. It will also be understood, of course, that the copper sheathing adjacent the weld may be removed, so that there will be no copper present at the joint 9.

After the metal capillary tube 3 is thus welded to the metal bulb 2, the lower open end of this bulb is closed by swaging and welding at the point designated 10. The glass stem 5 is then fused to the upper end of the metal capillary tube 3, and the bulb and capillary system are provided with mercury. Thereafter the thermometer is finished by closing the upper end of glass capillary tube and mounting it adjacent the suitably graduated scale 6.

The present disclosure is merely illustrative of applicant's invention, and the scope thereof is not to be limited thereby except in so far as it is defined in the following claims.

I claim:

1. The method of attaching a fine metal capillary tube to the material at the margin of an opening in a large metal tube which comprises positioning a separate electrode within the large metal tube, welding adjacent parts of said tubes together by developing a welding arc between said separate electrode and at least one of said tubes adjacent said opening while preventing the closure of the bore of the capillary tube.

2. The method of attaching a metal capillary tube to the material at the margin of an opening in a large metal tube which comprises inserting one end of the capillary tube in the opening in said large metal tube, positioning one end of a separate metal electrode within the large metal tube, welding adjacent parts of said tubes together by developing a welding arc between said separate electrode and at least one of said tubes adjacent said opening while passing gas through the capillary tube.

3. The method of attaching a metal capillary tube to the material at the margin of an opening in a large metal tube which comprises inserting one end of the capillary tube in the opening in said large metal tube, positioning one end of a separate metal electrode within the large metal tube, welding adjacent parts of said tubes together by developing a welding arc between said separate electrode and a region of one of said tubes adjacent said opening while passing reducing gas through the capillary tube.

4. The method of attaching a fine metal capillary tube to the material at the margin of an opening in a large metal tube which comprises inserting one end of the capillary tube in the opening in said large metal tube, positioning one end of a separate metal electrode within the large metal tube, joining adjacent parts of said tubes together by developing a welding arc between said separate electrode and a region of one of said tubes adjacent said opening while forcing hydrogen gas through the capillary tube.

5. The method of making a bulb with a capillary tube attached thereto which comprises inserting one end of a capillary tube in an opening in one end of a large metal tube, the other end of said large tube being open, positioning an independent metal electrode within the large metal tube and adjacent said tubes, welding adjacent parts of said tubes together by developing a welding arc between said electrode and at least one of said tubes adjacent said opening while forcing a gas through the capillary tube, removing said electrode from the large tube, and then closing the open end of said large tube.

6. The method of making a bulb with a capillary tube attached thereto which comprises inserting one end of a fine capillary tube in an opening in one end of a large metal tube, the other end of said large tube being open, positioning an independent metal electrode within the large metal tube and adjacent said tubes, welding adjacent parts of said tubes together by developing a welding arc between said electrode and at least one of said tubes adjacent said opening while forcing reducing gas through the capillary tube, removing said electrode from the large tube, and then closing the open end of said large tube by swaging and welding.

7. The method of joining a metal capillary tube to a metal bulb, said capillary tube being formed of an inner layer of metal having the characteristics of invar and an outer layer of copper, which comprises welding said capillary tube to said bulb and simultaneously dispersing the copper at the point of the weld through the material of the metal bulb.

8. The method of joining a metal capillary tube to the wall of an opening of a large metal bulb, said capillary tube being formed of an inner layer of metal having the characteristics of invar and an outer layer of copper, which comprises removing the copper layer from a portion of the capillary tube and then welding the remainder of that portion of the capillary tube to a portion of the wall of the opening of said large tube.

9. In a device of the class described, a metal bulb for holding an expansive fluid and a capillary tube opening into said bulb and joined thereto, said capillary tube comprising an inner layer of material having the characteristics of invar and an outer layer of copper.

10. In a device of the class described, a metal bulb for holding an expansive fluid and a capillary tube comprising an inner layer of a material having the characteristics of invar and an outer layer of copper, said capillary tube opening into said bulb and welded thereto with said copper layer dispersed through the metal bulb adjacent said weld.

11. In a device of the class described, a metal bulb for holding an expansive fluid and a capillary tube comprising an inner layer of a material having the characteristics of invar and an outer layer of copper, said capillary tube opening into said bulb and welded thereto with a portion of said copper layer removed from said capillary tube adjacent said weld.

KENNETH L. TATE.